United States Patent
Chew et al.

(10) Patent No.: US 12,498,798 B2
(45) Date of Patent: Dec. 16, 2025

(54) OPTICAL NAVIGATION DEVICE CAPABLE OF DETERMINING SHUTTER INTERVAL WITH MODE TRANSITION AND OPERATING METHOD THEREOF

(71) Applicant: PIXART IMAGING INC., Hsin-Chu County (TW)

(72) Inventors: Yen-Hsiang Chew, Penang (MY); Keng-Yeen Lye, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/663,079

(22) Filed: May 14, 2024

(65) Prior Publication Data
US 2025/0355508 A1    Nov. 20, 2025

(51) Int. Cl.
*G06F 3/03*    (2006.01)

(52) U.S. Cl.
CPC .................................. *G06F 3/0304* (2013.01)

(58) Field of Classification Search
CPC .... G06F 3/0304; G06F 3/033; G06F 3/03543; G06F 3/0354
See application file for complete search history.

(56) References Cited

U.S. PATENT DOCUMENTS

2004/0119695 A1* 6/2004 Lee .................. G06F 3/0317
345/166
2015/0301630 A1* 10/2015 Lee .................. G06F 3/0383
345/163

* cited by examiner

*Primary Examiner* — Patrick N Edouard
*Assistant Examiner* — Joseph P Fox
(74) *Attorney, Agent, or Firm* — HAUPTMAN HAM, LLP

(57) ABSTRACT

There is provided an optical navigation device including a light sensor and a processor. The light sensor is configured to capture image frames using a predetermined frame period. The processor is configured to calculate image statistics according to a first image frame captured by the light sensor and determine an expected shutter interval for capturing a second image frame according to the image statistics. The processor is further configured to control the light sensor to capture additional shutter tuning frames between the first image frame and the second image frame upon confirming a mode transition at or prior to the first image frame.

18 Claims, 6 Drawing Sheets

OPTICAL NAVIGATION DEVICE CAPABLE OF DETERMINING SHUTTER INTERVAL WITH MODE TRANSITION AND OPERATING METHOD THEREOF

FIELD OF THE DISCLOSURE

This disclosure generally relates to an optical navigation device and, more particularly, to an optical navigation device that may determine a proper shutter interval even with a mode transition occurs, and a shutter interval determining method thereof.

BACKGROUND OF THE DISCLOSURE

Please refer to FIG. 1, it is an operational schematic diagram of a conventional optical mouse device 10. The optical mouse device 10 determines a displacement data by computing a relative displacement between two images (e.g., shown as Image N and Image N+1) acquired at two different times (e.g., shown Times T_1 and T_2). These two images N and N+1 are required to have relatively similar pixel characteristics (e.g., minimum, maximum and average pixel values) and surface quality (SQUAL) in order to produce an accurate displacement determination.

It is known that amount of light captured by a pixel array of the optical mouse device 10 to form an image is dependent on a shutter interval. The optical mouse device 10 generally computes an "expected shutter interval" of the image N+1 according to pixel statistics S_1 of the image N so as to minimize the statistical deviation between the images N and N+1. Under normal operating conditions without any mode transition, the optical mouse device 10 is assumed to be moved along a common surface with relatively uniform surface characteristics, and hence shutter interval adjustments for successive images are performed without significant problems.

Nevertheless, some mode transition events in the image N such as the "run to rest" mode transition and filter switching may cause an abrupt change in analog pixel array characteristics in the image N+1. Changes in the analog pixel array characteristics will cause the acquired image N+1 (after the mode transition) to have significantly different pixel statistics compared to the image N.

Therefore, it is required to provide a method that can deal with this abrupt change in analog pixel array characteristics, which causes the pixel statistics between the images prior to and behind a mode transition, to be substantially identical.

SUMMARY

Accordingly, the present disclosure provides an optical navigation device that adaptably determines a shutter interval for a next image captured right behind a mode transition so as to compensate an abrupt change in image statistics discontinuity caused by the mode transition, and a shutter interval determining method thereof.

The present disclosure provides an optical navigation device and a shutter interval determining method thereof that optimally tune a shutter interval during mode transitions by invoking multiple shutter tuning frames captured between two images for calculating a relative displacement of the optical navigation device.

The present disclosure provides an optical navigation device including a light sensor and a processor. The light sensor captures a first image frame and a second image frame separated by a predetermined frame period. The processor is electrically coupled to the light sensor and configured to receive the first image frame, calculate image statistics of the first image frame, and control the light sensor to capture multiple shutter tuning frames having a tunable shutter interval between the first image frame and the second image frame upon identifying a mode transition according to the image statistics.

The present disclosure further provides a shutter interval determining method of an optical navigation device, which includes a light sensor and a processor. The shutter interval determining method includes the steps of: acquiring, by the light sensor, image frames at a predetermined frame period; identifying a mode transition; invoking multiple shutter tuning frames between the predetermined frame period in response to the mode transition; and determining a shutter interval of an image frame right after the mode transition according to image statistics of the multiple shutter tuning frames.

The present disclosure further provides an optical navigation device including a light sensor and a processor. The light sensor captures a first image frame, with a first shutter interval, and a second image frame separated from the first image frame by a predetermined frame period. The processor is electrically coupled to the light sensor and configured to receive the first image frame, calculate image statistics of the first image frame, control the light sensor to capture the second image frame using a second shutter interval, wherein the second shutter interval is arranged as the first shutter interval plus a predetermined adjustment upon no mode transition being identified. Alternatively, upon determination of a mode transition from a first image frame, the processor is configured to control the light sensor to capture the second image frame using a second shutter interval, wherein the second shutter interval is arranged as the first shutter interval multiplied by a predetermined scaling factor responsive to the mode transition at the first image frame. In addition, the processor is configured to control the light sensor to capture at least one additional shutter tuning frame within the predetermined frame period between first image frame and second image frame to determine a tuning value of the predetermined scaling factor upon a mode transition being identified at the first image frame.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to optimally determine a shutter interval to deal with a mode transition condition to cause an image frame to have image statistics substantially identical to a previous image frame at which the mode transition being identified/recognized.

In the present disclosure, the mode transition includes, for example, a change of at least one of an image filter (e.g., for filtering image data), a device configuration, an analog pixel gain, a light source driving parameter (e.g., driving current or voltage), analog pixel array characteristics (e.g., pixel binning), an analog pixel array operating voltage, an activated array size (e.g., reducing the size for saving power) and other sensor configurations that may affect/influence the determination of the shutter interval.

Figure 1:
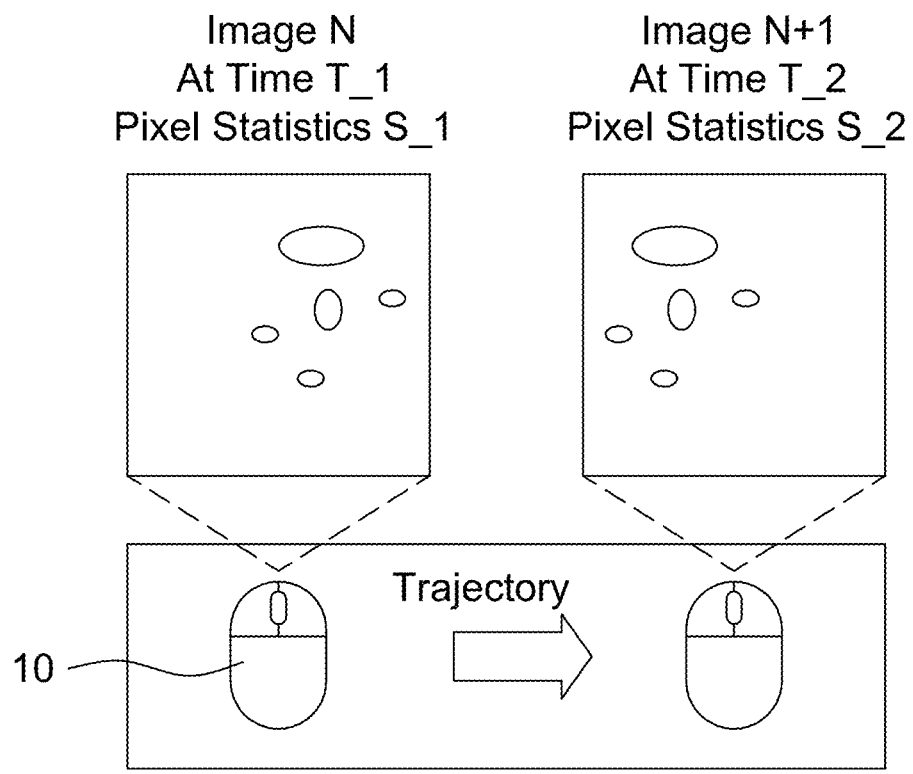
FIG. 1 is an operational schematic diagram of a conventional optical mouse device.
Figure 2:
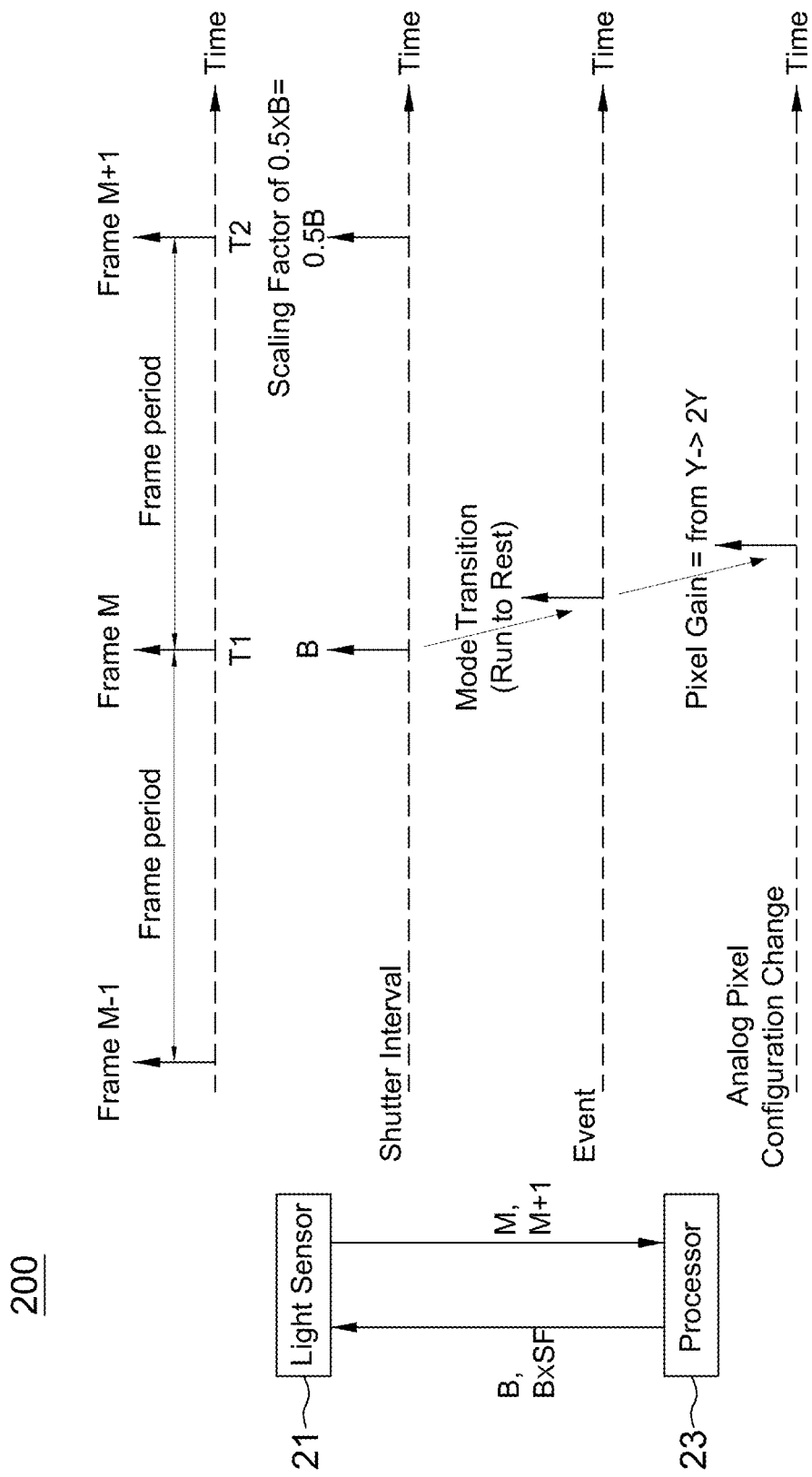
FIG. 2 is an operational schematic diagram of an optical navigation device according to one embodiment of the present disclosure without shutter tuning frames.

Please refer to FIG. 2, it is an operational schematic diagram of an optical navigation device 200 according to one embodiment of the present disclosure. The optical navigation device 200 is, for example, an optical mouse device, an optical gaming mouse, an optical finger mouse, cleaning robot or the like.

The optical navigation device 200 includes a light sensor 21 and a processor 23, which is electrically coupled to the light sensor 21. The light sensor 21 is, for example, a complementary metal oxide semiconductor (CMOS) image sensor, a single photon avalanche diode (SPAD) image sensor, a charge-coupled device (CCD) image sensor or the like. The processor 23 is, for example, a digital signal processor (DSP), an application specific integrated circuit (ASIC), a micro controller unit (MCU), a field programmable gate array (FPGA) or the like. The light sensor 21 and the processor 23 are arranged in the same chip/package or in different chips/packages according to different applications.

The light sensor 21 captures a first image frame (e.g., shown as Frame M) at time T1 and a second image frame (e.g., shown as Frame M+1) at time T2 separated by a predetermined frame period. The processor 23 receives the first image frame (Frame M) and the second image frame (Frame M+1) from the light sensor 21, and determines a shutter interval (e.g., shown as B and BxSF) for capturing the first image frame (Frame M) and the second image frame (Frame M+1) to be sent to the light sensor 21 to control the image capturing thereof.

In the present disclosure, the frame period is not necessary to be a fixed value. The frame period in the present disclosure is a time interval between two successive image frames for calculating the displacement of the optical navigation device 200. As shown in FIG. 2, the light sensor 21 captures the first image frame (Frame M) using a first shutter interval B. FIG. 2 also shows that a mode transition (e.g., shown as "run to rest" as an example for illustration purposes) is identified by the processor 23 at the first image frame (Frame M) or prior to the first image frame (e.g., between Frame M and a previous Frame M−1).

For example, when identifying a mode transition (shown as Event in FIG. 2), the processor 23 doubles a pixel gain (e.g., shown as from Y to 2Y). To compensate this pixel gain change, the shutter interval is changed from B used in Frame M to 0.5B used in Frame M+1. Failure to do so may prevent the optical navigation sensor 200 from remaining in a rest mode since generally an abrupt change of image statistics may wakeup the optical navigation sensor 200. When there is no a mode transition being identified at or prior to the first image frame, the processor controls the light sensor 21 to capture the second image frame using the first shutter plus an adjustment, which is determined according to the image statistics of the first image frame.

Figure 3:
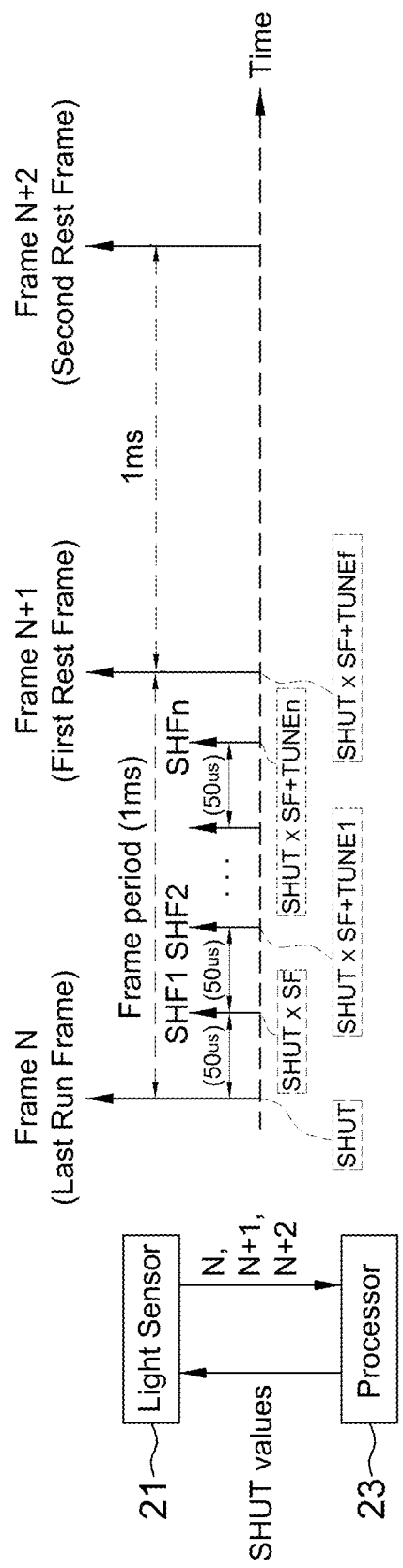
FIG. 3 is an operational schematic diagram of an optical navigation device with shutter tuning frames according to one embodiment of the present disclosure.
Figure 4:
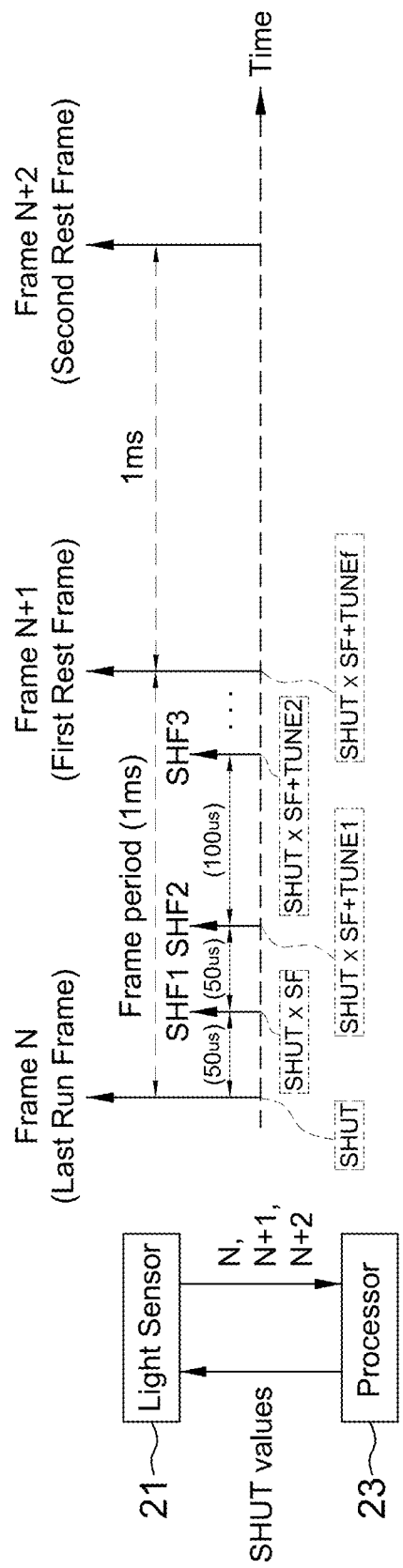
FIG. 4 is an operational schematic diagram of an optical navigation device with shutter tuning frames according to another embodiment of the present disclosure.

Please refer to FIGS. 3 and 4, they are operational schematic diagrams of an optical navigation device 200 with shutter tuning frames according to some embodiments of the present disclosure. This embodiment takes the mode transition as a "run to rest" (i.e. the optical navigation device 200 not being operated for a predetermined time interval) as an example.

In the present disclosure, the processor 23 calculates the displacement of the optical navigation device 200 using image frames (e.g., Frame N and Frame N+1) but not using the multiple shutter tuning frames, e.g., shown as SHF1, SHF2 to SHFn.

As shown in FIGS. 3 and 4, the light sensor 21 captures a first image frame (e.g., shown as Frame N) and a second image frame (e.g., shown as Frame N+1) separated by a predetermined frame period (e.g., shown as 1 ms, but not limited to). It is assumed that the processor 23 identifies a mode transition from "run to rest" at the first image frame (Frame N) or prior to the first image frame (Frame N), and the light sensor 21 captures the first image frame (Frame N) using a shutter interval (e.g., shown as SHUT).

In this embodiment, the processor 23 controls the light sensor 21 to capture the second image frame (Frame N+1) using the shutter interval (SHUT) plus an adjustment upon no mode transition (or event) being identified at or prior to the first image frame (Frame N). The processor 23 further controls the light sensor 21 to capture the second image frame using the first shutter multiplied by a predetermined scaling factor, and to capture at least one additional shutter tuning frame SHF1 to SHFn within the predetermined frame period to determine one or more tuning values (e.g., shown as TUNE1 . . . . TUNEn and TUNEf) of the predetermined scaling factor (SF) or of a multiplication of SHUT×SF upon a mode transition being identified at or prior to the first image frame (Frame N).

In the present disclosure, the predetermined scaling factor is determined according to a category of the mode transition. For example, FIG. 2 shows that when the pixel gain is doubled due to a "run to rest" mode transition, the predetermined scaling factor is selected as 0.5. More specifically, each type of the mode transition (e.g., the image filter, a device configuration, analog pixel gain, light source driving parameter, analog pixel array characteristics, analog pixel array operating voltage, activated array size mentioned above) has a corresponding scaling factor previously recorded in a memory/register (not shown) of the optical navigation device 200. Upon one type of the mode transition is identified by the processor 23, the processor 23 selects a corresponding scaling factor for altering the shutter interval (e.g., B) used in acquiring the image frame (Frame M). In another aspect, the processor 23 directly selects a new shutter interval corresponding to the mode transition.

Referring to FIGS. 3 and 4 again, the processor 23 receives the first image frame (Frame N), calculates image statistics of the first image frame (Frame N), and controls the light sensor 21 to capture at least one (e.g., shown multiple in FIG. 3) shutter tuning frame (e.g., shown by SHF1 to SHFn) having a shutter interval (e.g., shown as SHUT, SHUT×SF, SHUT×SF+TUNE1 SHUT×SF+TUNEn and SHUT×SF+TUNEf) between the first image frame (Frame N) and the second image frame (Frame N+1) upon identifying a mode transition according to the image statistics of the first image frame (Frame N). Preferably, a shutter tuning frame interval (e.g., shown as 50 μs, but not limited to) of the multiple shutter tuning frames SHF1 to SHFn is arranged as a minimum time interval operable by the light sensor 21 so as to insert as many shutter tuning frames within the predetermined frame period as possible and to reach an expected shutter interval as soon as possible.

In the present disclosure, the multiple shutter tuning frames SHF1 to SHFn may have a constant shutter tuning frame period (e.g., shown in FIG. 3) or varied shutter tuning frame periods (e.g., shown in FIG. 4). The main difference between the aspects of FIG. 3 and FIG. 4 is that FIG. 4 shows varied shutter tuning frame periods, a part of or all of the shutter tuning frame periods being different, and other parts of FIG. 4 are identical to those of FIG. 3.

In one aspect, a number of multiple shutter tuning frames is a predetermined fixed value. For example, it is preset that the processor 23 controls the light sensor 21 to acquire additional 3 to 10 shutter tuning frames within the predetermined frame period.

In the case that the number of multiple shutter tuning frames is a predetermined fixed value, the first shutter tuning frames SHF1 may not be acquired right after the first image frame (Frame N). For example referring to FIG. 5, when the number of multiple shutter tuning frames is preset as 3, the three shutter tuning frames are acquired right before the image frame (Frame N+1). The determination of the shutter intervals SHUT×SF, SHUT×SF+TUNE1 and SHUT×SF+TUNE2 is similar to those of FIGS. 3-4, and thus details thereof are not repeated again. The SHUT values sent from the processor 23 to the light sensor 21 shown in FIGS. 3 to 5 include SHUT×SF, SHUT×SF+TUNE1 to SHUT×SF+TUNEn.

In another aspect, a number of multiple shutter tuning frames is determined according to a variation of image statistics of the multiple shutter tuning frames SHF1 to SHFn. Referring to FIGS. 3 and 4 again, the processor 23 controls the light sensor 21 to capture a first shutter tuning frame SHF1 among the multiple shutter tuning frames using a shutter interval, for the first image frame (Frame N), multiplied by a scaling factor (i.e. SHUT×SF), and captures a followed shutter tuning frame (e.g., SHF2, SHF3 . . . ) behind the first shutter tuning frame SHF1 by tuning the scaling factor or tuning a multiplication of shutter interval× scaling factor (i.e. SHUT×SF) with a constant or varied incremental or decremental step according to image statistics of a previous shutter tuning frame (e.g., SHF1, SHF2 . . . respectively previous to SHF2, SHF3 . . . ) of the followed shutter tuning frame. That is, the TUNE1 to TUNEn shown in FIGS. 3 and 4 are increased or decreased at a constant step or varied steps.

For example, when the shutter tuning frame SHF2 has image statistics larger than or smaller than that of the shutter tuning frame SHF1, the scaling factor SF or the SHUT×SF is decreased or increased by TUNE1. In the case that the tuning value is a varied step, the larger difference between the image statistics of the shutter tuning frames SHF1 and SHF2 is, the larger TUNE1 is selected; on the contrary, the smaller difference between the image statistics of the shutter tuning frames SHF1 and SHF2 is, the smaller TUNE1 is selected.

In one aspect, the number of multiple shutter tuning frames SHF1 to SHFn is determined upon at least two tunable shutter intervals of successive shutter tuning frames among the multiple shutter tuning frames SHF1 to SHFn being identical. For example, when the shutter tuning frames SHF1 and SHF2 is determined (by the processor 23) to have identical shutter intervals (i.e. image statistics of SHF1 and SHF2 being identical), i.e. SHUT×SF=SHUT×SF+TUNE1 (i.e. TUNE1=0), the light sensor 21 stops further acquiring extra shutter tuning frame, i.e. the number of multiple shutter tuning frames being determined as 2 and the SHUT× SF+TUNEf=SHUT×SF+TUNE1; when the shutter tuning frames SHF2 and SHF3 is determined (by the processor 23) to have identical shutter intervals (i.e. image statistics of SHF2 and SHF3 being identical), i.e. SHUT×SF+ TUNE1=SHUT×SF+TUNE2 (i.e. TUNE2=TUNE1), the light sensor 21 stops further acquiring extra shutter tuning frame, i.e. the number of multiple shutter tuning frames being determined as 3 and the SHUT×SF+TUNEf=SHUT× SF+TUNE2; and so on.

In other words, the present disclosure provides an electronic product, e.g., an optical navigation device, arranged to be operated in a first mode and a second mode, e.g., the reset mode and running mode mentioned above. The electronic product includes an optical sensor (e.g., the light sensor 21 shown in FIG. 3-5) that captures a last image in the first mode before switching to the second mode, and captures a first image after the second mode is entered. The optical sensor further captures at least one evaluation image (e.g., the SHF1 to SHFn shown in FIGS. 3-5) between the last image and the first image. In the present disclosure, the at least one evaluation image is only used to adjust a shutter time of the optical sensor for capturing images in the second mode, and the at least one evaluation image is not used to calculate displacement of the electronic product. In one aspect, a time period between the last image and the first image is identical to a time period between the first image and a second image captured right behind the first image by the optical sensor in the second mode.

Figure 6:
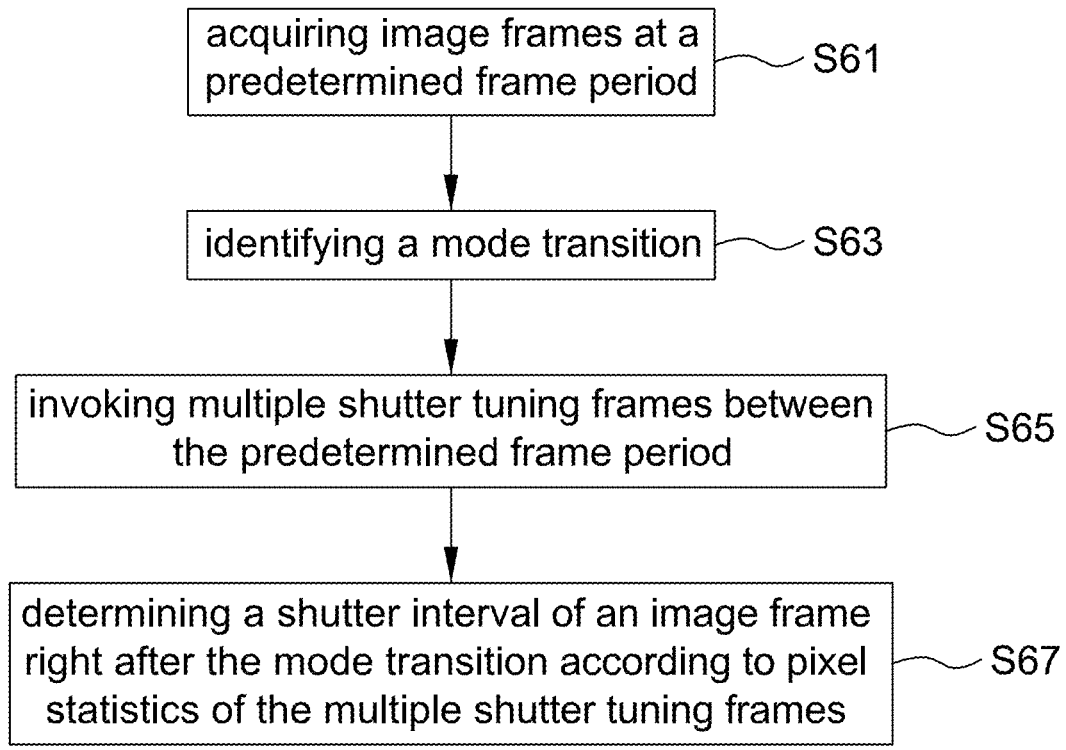
FIG. 6 is a flow chart of a shutter interval determining method of an optical navigation device according to one embodiment of the present disclosure.

Please refer to FIG. 6, it is a flow chart of a shutter interval determining method of an optical navigation device 200 according to one embodiment of the present disclosure, including the steps of: acquiring, by a light sensor, image frames at a predetermined frame period (Step S61); identifying, by a processor, a mode transition (Step S63); invoking multiple shutter tuning frames between the predetermined frame period in response to the mode transition (Step S65); and determining, by a processor, a shutter interval of an image frame right after the mode transition according to image statistics of the multiple shutter tuning frames (Step S67).

Referring to FIGS. 3 to 6, details of the shutter interval determining method are described hereinafter.

Step S61: The light sensor 21 acquires image frames, e.g., Frames N, N+1 and N+2, at a predetermined frame period, e.g., shown as 1 ms.

Step S63: The processor 23 receives the image frame (Frame N) to identify whether a mode transition occurs or not.

Figure 5:
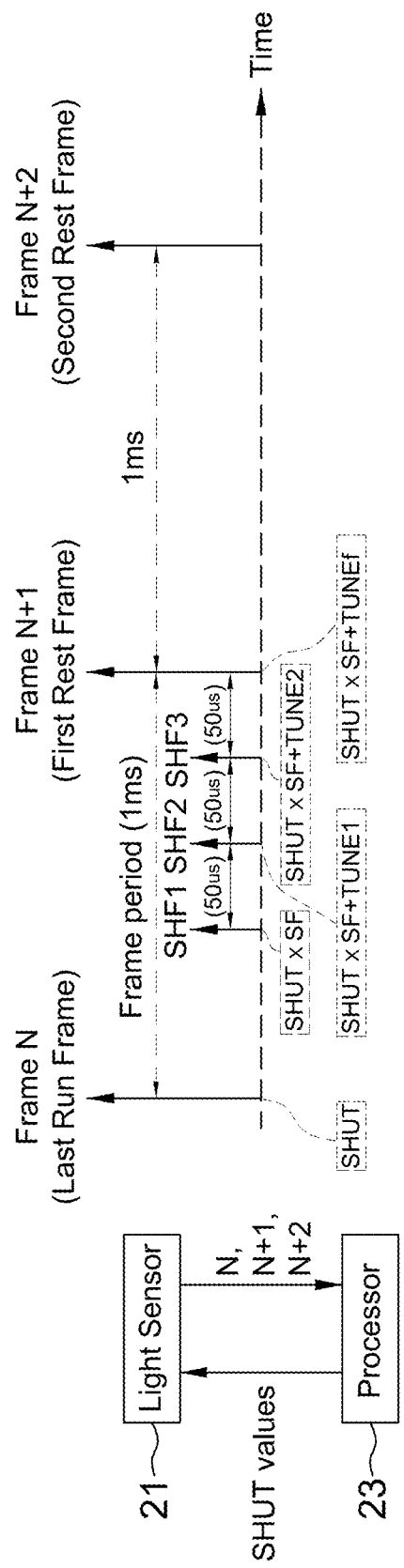
FIG. 5 is an operational schematic diagram of an optical navigation device with shutter tuning frames according to a further embodiment of the present disclosure.

Step S65: When the mode transition (e.g., "run to rest", but not limited to) is identified, the processor 23 controls the light sensor 21 to additionally capture at least one shutter tuning frame or multiple shutter tuning frames, e.g., shown as SHF1 to SHFn, in response to the mode transition. As shown in FIGS. 3-5, the image frame (Frame N) is acquired using a shutter interval (SHUT), a first shutter tuning frame SHF1 among the multiple shutter tuning frames is distributed with a shutter interval SHUT×SF and a second shutter tuning frame SHF2 among the multiple shutter tuning frames is distributed with a shutter interval SHUT×SF+ TUNE1, wherein TUNE1 is a positive value or a negative value depending on whether the image statistics of the first shutter tuning frame SHF1 is larger than or smaller than that of the image frame (Frame N).

Step S67: After sequentially tuning (increasing or decreasing) the shutter intervals for the multiple shutter tuning frames SHT1 to SHFn, it is able to determine a more proper shutter interval for the image frame (Frame N+1) to cause the image frames (Frame N and Frame N+1) to have substantially identical image statistics. As mentioned above, TUNE1 to TUNEn may be increased or decreased by a constant step or varied steps according to different arrangements.

It should be mentioned that the values, e.g., shutter intervals, a number of shutter tuning frames and frame periods, mentioned in the present disclosure are only intended to illustrate but not to limit the present disclosure.

It should be mentioned that although the drawings of the present disclosure show that the light sensor 21 invokes multiple shutter tuning frames between the image frames N and N+1, it is only intended to illustrate but not to limit the present disclosure. For example, in the case that a number of multiple shutter tuning frames is determined according to a variation of image statistics of the shutter tuning frames, the light sensor 21 invokes only one shutter tuning frame if the one shutter tuning frame has the image statistics identical to that of the image frame N. That is, the processor 23 controls the light sensor 21 to invoke at least one shutter tuning frame upon an abrupt mode transition occurred at or prior to the image frame N.

In some embodiments, only modules/circuits in the optical navigation device 200 for shutter interval tuning (e.g., image statistics and shutter interval computation) are enabled within a frame period in which the multiple shutter tuning frames are invoked, and other modules/circuits not for the shutter interval tuning (e.g., DC remover, correlator, lift detector, but not limited to) are clock gated or disabled for power saving.

In some embodiments, the image statistics include, for example, the minimum pixel value, the maximum pixel value and an average pixel value of a captured image frame as well as an image quality of the captured image frame, but not limited to.

As mentioned above, the conventional optical mouse device determines a shutter interval of an image according to image statistics of a previous image. However, because the optical mouse device can be operated on various surfaces such as glossy, matte, dark, colorful, striped, white paper or glass, it is difficult for the optical mouse device to accurately determine a tracking surface type during mode transitions such that it is not able to optimally tune a shutter interval during mode transitions. Accordingly, the present disclosure further provides an optical navigation device (e.g., referring to FIGS. 2-5) and a shutter interval determining method thereof (e.g., referring to FIG. 6) that invoke at least one shutter tuning frame, which is not used to calculate the displacement of the optical navigation device, between two image frames, which are used to calculate the displacement of the optical navigation device, in which a mode transition is identified at the prior image frame among the two image frames. The multiple shutter tuning frames use a tunable shutter interval to fine tune a shutter interval for the later image frame among the two image frames so as to be adaptable to different tracking surfaces.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. An optical navigation device, comprising:
    a light sensor, configured to capture a first image frame and a second image frame separated by a predetermined frame period; and
    a processor, electrically coupled to the light sensor and configured to
        receive the first image frame,
        calculate image statistics of the first image frame, and
        control the light sensor to capture multiple shutter tuning frames having a tunable shutter interval between the first image frame and the second image frame upon identifying a mode transition according to the image statistics,
    wherein the processor is configured not to calculate displacement of the optical navigation device using the multiple shutter tuning frames.

2. The optical navigation device as claimed in claim 1, wherein the mode transition is a change of at least one of an image filter, a device configuration, an analog pixel gain, a light source driving parameter, analog pixel array characteristics, an analog pixel array operating voltage, and an activated array size.

3. The optical navigation device as claimed in claim 1, wherein a shutter tuning frame interval of the multiple shutter tuning frames is arranged as a minimum time interval operable by the light sensor.

4. The optical navigation device as claimed in claim 1, wherein a number of the multiple shutter tuning frames is a predetermined fixed value.

5. The optical navigation device as claimed in claim 1, wherein a number of the multiple shutter tuning frames is determined according to a variation of image statistics of the multiple shutter tuning frames.

6. The optical navigation device as claimed in claim 5, wherein the number of the multiple shutter tuning frames is determined upon at least two tunable shutter intervals of successive shutter tuning frames among the multiple shutter tuning frames being identical.

7. The optical navigation device as claimed in claim 5, wherein the processor is configured to control the light sensor to
    capture a first shutter tuning frame among the multiple shutter tuning frames using a shutter interval, for the first image frame, multiplied by a scaling factor, and
    capture a followed shutter tuning frame behind the first shutter tuning frame by tuning the scaling factor or tuning a multiplication of shutter interval×scaling factor with a constant or varied step according to image statistics of a previous shutter tuning frame of the followed shutter tuning frame.

8. The optical navigation device as claimed in claim 1, wherein the multiple shutter tuning frames have a constant shutter tuning frame period or varied shutter tuning frame periods.

9. A shutter interval determining method of an optical navigation device, which comprises a light sensor and a processor, the shutter interval determining method comprising:
    acquiring, by the light sensor, image frames at a predetermined frame period;
    identifying a mode transition;
    invoking multiple shutter tuning frames between the predetermined frame period in response to the mode transition;

determining a shutter interval of an image frame right after the mode transition according to image statistics of the multiple shutter tuning frames; and calculating, by the processor, displacement using the image frames but not using the multiple shutter tuning frames.

10. The shutter interval determining method as claimed in claim 9, wherein the mode transition is a change of at least one of an image filter, a device configuration, an analog pixel gain, a light source driving parameter, analog pixel array characteristics, an analog pixel array operating voltage, and an activated array size.

11. The shutter interval determining method as claimed in claim 9, wherein a shutter tuning frame interval of the multiple shutter tuning frames is arranged as a minimum time interval operable by the light sensor.

12. The shutter interval determining method as claimed in claim 9, wherein a number of the multiple shutter tuning frames is a predetermined fixed value.

13. The shutter interval determining method as claimed in claim 9, wherein a number of the multiple shutter tuning frames is determined according to a variation of the image statistics of the multiple shutter tuning frames.

14. The shutter interval determining method as claimed in claim 13, wherein the number of the multiple shutter tuning frames is determined upon at least two tunable shutter intervals of successive shutter tuning frames among the multiple shutter tuning frames being identical.

15. The shutter interval determining method as claimed in claim 13, further comprising:

capturing, by the light sensor, a first shutter tuning frame among the multiple shutter tuning frames using a shutter interval, for an image frame at which the mode transition occurs, multiplied by a scaling factor, and capturing a followed shutter tuning frame behind the first shutter tuning frame by tuning the scaling factor or tuning a multiplication of shutter interval×scaling factor with a constant or varied step according to image statistics of a previous shutter tuning frame of the followed shutter tuning frame.

16. The shutter interval determining method as claimed in claim 9, wherein the multiple shutter tuning frames have a constant shutter tuning frame period or varied shutter tuning frame periods.

17. An optical navigation device, comprising:

a light sensor, configured to capture a first image frame, with a first shutter interval, and a second image frame separated from the first image frame by a predetermined frame period; and a processor, electrically coupled to the light sensor and configured to receive the first image frame, calculate image statistics of the first image frame, control the light sensor to capture the second image frame using the first shutter interval plus an adjustment upon no mode transition being identified at the first image frame, and control the light sensor to capture the second image frame using the first shutter interval multiplied by a predetermined scaling factor, and to capture at least one additional shutter tuning frame within the predetermined frame period to determine a tuning value of the predetermined scaling factor upon a mode transition being identified at the first image frame.

18. The optical navigation device as claimed in claim 17, wherein the mode transition is a change of at least one of an image filter, a device configuration, an analog pixel gain, a light source driving parameter, analog pixel array characteristics, an analog pixel array operating voltage, and an activated array size, and the predetermined scaling factor is determined according to a category of the mode transition.

* * * * *